(12) United States Patent
Osborn et al.

(10) Patent No.: US 11,682,012 B2
(45) Date of Patent: Jun. 20, 2023

(54) CONTACTLESS DELIVERY SYSTEMS AND METHODS

(71) Applicant: Capital One Services, LLC, McLean, VA (US)

(72) Inventors: Kevin Osborn, Newton Highlands, MA (US); Asher Smith-Rose, McLean, VA (US); Andrea Montealegre, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/160,049

(22) Filed: Jan. 27, 2021

(65) Prior Publication Data

US 2022/0237607 A1    Jul. 28, 2022

(51) Int. Cl.
G06Q 20/40  (2012.01)
G06Q 20/38  (2012.01)

(52) U.S. Cl.
CPC ....... *G06Q 20/401* (2013.01); *G06Q 20/3821* (2013.01); *G06Q 20/3825* (2013.01); *G06Q 20/3829* (2013.01)

(58) Field of Classification Search
None
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |

(Continued)

FOREIGN PATENT DOCUMENTS

| CA | 3010336 | 7/2017 |
|---|---|---|
| CN | 101192295 | 6/2008 |

(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Chrystina E Zelaskiewicz
(74) *Attorney, Agent, or Firm* — Hunton Andrews Kurth LLP

(57) ABSTRACT

A contactless delivery system is provided. The contactless delivery system includes a contactless card storing a cryptogram containing a unique identifier associated with a user account. After entry into a communication field, the contactless card is configured to transmit the cryptogram to a server. Upon receipt of the cryptogram, the server is configured to validate and decrypt the cryptogram, and extract the unique identifier. The server can query a database for an identity of the user account using the unique identifier, generate a digital signature based on the identity of the user account, and transmit a verification notification including the identity of the user account and the digital signature.

20 Claims, 10 Drawing Sheets

(56) References Cited

U.S. PATENT DOCUMENTS

| | | |
|---|---|---|
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Hohmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |

(56) References Cited

U.S. PATENT DOCUMENTS

| | | |
|---|---|---|
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijay shankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van OS et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,541,995 B1 | 1/2020 | Mossler et al. |
| 11,055,713 B1* | 7/2021 | Dowling ............ G06Q 20/3829 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |

(56) References Cited

U.S. PATENT DOCUMENTS

| | | |
|---|---|---|
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Caiman et al. |
| 2013/0200999 A1 | 8/2013 | Spodak et al. |
| 2013/0212025 A1* | 8/2013 | Tanner .............. G06Q 20/401 |
| | | 705/44 |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |

(56) References Cited

U.S. PATENT DOCUMENTS

| | | |
|---|---|---|
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0285653 A1* | 10/2018 | Li ..................... G06Q 10/0833 |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0156335 A1* | 5/2019 | Safak ................ G06Q 20/385 |
| 2019/0238517 A1 | 8/2019 | D'Agostino et al. |
| 2019/0354665 A1* | 11/2019 | Haslam ............... G06Q 10/00 |
| 2020/0104474 A1* | 4/2020 | Duane .................. H04W 12/72 |
| 2020/0104891 A1* | 4/2020 | Rule ................... G07C 9/00182 |
| 2020/0320598 A1 | 10/2020 | Rule et al. |
| 2022/0014912 A1* | 1/2022 | Wilson ............... H04W 12/06 |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |
| WO | WO 2018063809 | 4/2018 |
| WO | WO 2018137888 | 8/2018 |

OTHER PUBLICATIONS

Haykin M. and Warnar, R., "Smart Card Technology: New Methods for Computer Access Control," Computer Science and Technology NIST Special Publication 500-157:1-60 (1988).
Lehpamer, Harvey, "Component of the RFID System," RFID Design Principles, 2nd edition pp. 133-201 (2012).
Pourghomi, Pardis et al., "A Proposed NFC Payment Application," International Journal of Advanced Computer Science and Applications, vol. 4, No. 8 (2013).
Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.
Author Unknown, "Add Account Updater to your recurring payment tool," [online] 2018-19 [retrieved on Mar. 26, 2019]. Retrieved from Internet URL: https://www.authorize.net/our-features/account-updater/, 5 pages.
Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.
Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

(56) References Cited

OTHER PUBLICATIONS

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.
Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.
Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K, "Goldbug Big Seven open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018], Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song, F., and Yun, A.l, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019], Retrieved from Internet URL: http://isis.poly.edu/courses/cs6903/Lectures/lecture10.pdf, 8 pages.
Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.
Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.es.ru.nl/E.Poll/papers/EMVtechreport.pdf, 37 pages.
Author Unknown, "Autofill", Computer Hope [online] 2018 [retrieved on Mar. 25, 2019], Retrieved from Internet URL: https://www.computerhope.eom/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co-GENIE.Platform%3DDesktop&hl=en, 3 pages.
Author unknown, "Autofill credit cards, contacts, and passwords in Safari on Mac", Apple Safari User Guide [online] 2019 [retrieved on Mar. 25, 2019], Retrieved from Internet URL: https://support.apple.com/guide/safari/use-autofill-ibrw1103/mac, 3 pages.
Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone" Conference paper (2013) IEEE Africon at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author unknown: "onetappayment™", [online] Jan. 24, 2019, [retrieved on Mar. 25, 2019]. Retrieved from Internet URL: https://www.payubiz.in/onetap, 4 pages.
Vu et al., (2012). "Distinguishing users with capacitive touch communication" Proceedings of the Annual International Conference on Mobile Computing and Networking, MOBICOM. 10.1145/2348543.2348569.
EMVCo, EMV Card Personalization Specification, version 1.0 (Jun. 2003), 81 pages.
Ullmann et al., (2012). "On-Card" User Authentication for Contactless Smart Cards based on Gesture Recognition, LNI, 223-234, 12 pages.
Faraj et al. (2008). "Investigation of Java Smart Card Technology for Multi-Task Applications" J. of Al-Anbar University for Pure Science, vol. 2: No. 1: 2008, 11 pages.
Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.
International Search Report and the Written Opinion of the International Searching Authority issued in related PCT Application No. PCT/US2022/013640 dated May 11, 2022.

\* cited by examiner

CONTACTLESS DELIVERY SYSTEMS AND METHODS

FIELD OF THE INVENTION

The present disclosure relates generally to delivery management, and more particularly, to contactless delivery systems and methods.

BACKGROUND

Electronic commerce is becoming increasingly widespread and common. Online shopping, where items are purchased online and shipped to the purchasing customer at a residential address, commercial address, or other location, constitutes a large and growing sector of the global economy. With the number and value of goods purchased online and shipped for delivery increasing, along in-store pickup and other forms of receiving goods, it is critical that efficient, timely, and secure deliveries can be made.

In social distancing scenarios, it is difficult to identify people without close physical personal contact. For example, when a package is delivered to a customer, the customer generally needs to identify himself or herself to complete the delivery and receive the package. As another example, a customer may arrange to pick up a package from a store, and the customer may call a phone number indicating he or she has arrived at the store. But the customer has to identify himself or herself to ensure the secure pick up of the package, and presenting a form of identification (e.g., a driver's license) to store personnel is difficult without physical contact or coming into close proximity to store personnel. In another example, a package may being delivered to a customer by a delivery person, and this may require the customer to verify himself or herself to the delivery person, such that the package can be delivered to the correct recipient and in a secure manner. In many such interactions, social distancing is not possible and the identification and verification process is not efficient.

These and other deficiencies exist. Accordingly, there is a need to provide systems and methods that overcome these deficiencies to verify customers in a secure and efficient manner while minimizing physical contact or close interactions between people.

SUMMARY

Aspects of the disclosed technology include systems and methods for contactless package delivery.

Embodiments of the present disclosure provide a contactless delivery system. The contactless delivery system includes a contactless card. The contactless card includes a processor and a memory. The memory stores a cryptogram that contains a unique identifier associated with a user account. After entry into a communication field, the contactless card is configured to transmit the cryptogram to a server via one or more intermediary devices. Upon receipt of the cryptogram, the server is configured to: validate the cryptogram; decrypt the cryptogram and extract the unique identifier; query, using the unique identifier, a database for an identity of the user account; generate a digital signature based on the identity of the user account; and transmit a verification notification including the identity of the user account and the digital signature.

Embodiments of the present disclosure provide a contactless delivery system. The contactless system includes a server comprising a processor and a memory. The server is configured to: receive a cryptogram containing an unique identifier associated with a user account; validate the cryptogram; decrypt the cryptogram and extract the unique identifier; query, using the unique identifier, a database for an identity of the user account; generate a digital signature based on the identity of the user account; and transmit a verification notification including the identity of the user account and the digital signature.

Embodiments of the present disclosure provide a contactless delivery method. The contactless method comprises: receiving a cryptogram, the cryptogram containing an unique identifier associated with a user account; validating the cryptogram; decrypting the cryptogram and extracting the unique identifier; querying, using the unique identifier, a database for an identity of the user account; generating a digital signature based on the identity of the user account; and transmitting a verification notification including the identity of the user account and the digital signature.

Further features of the disclosed systems and methods, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
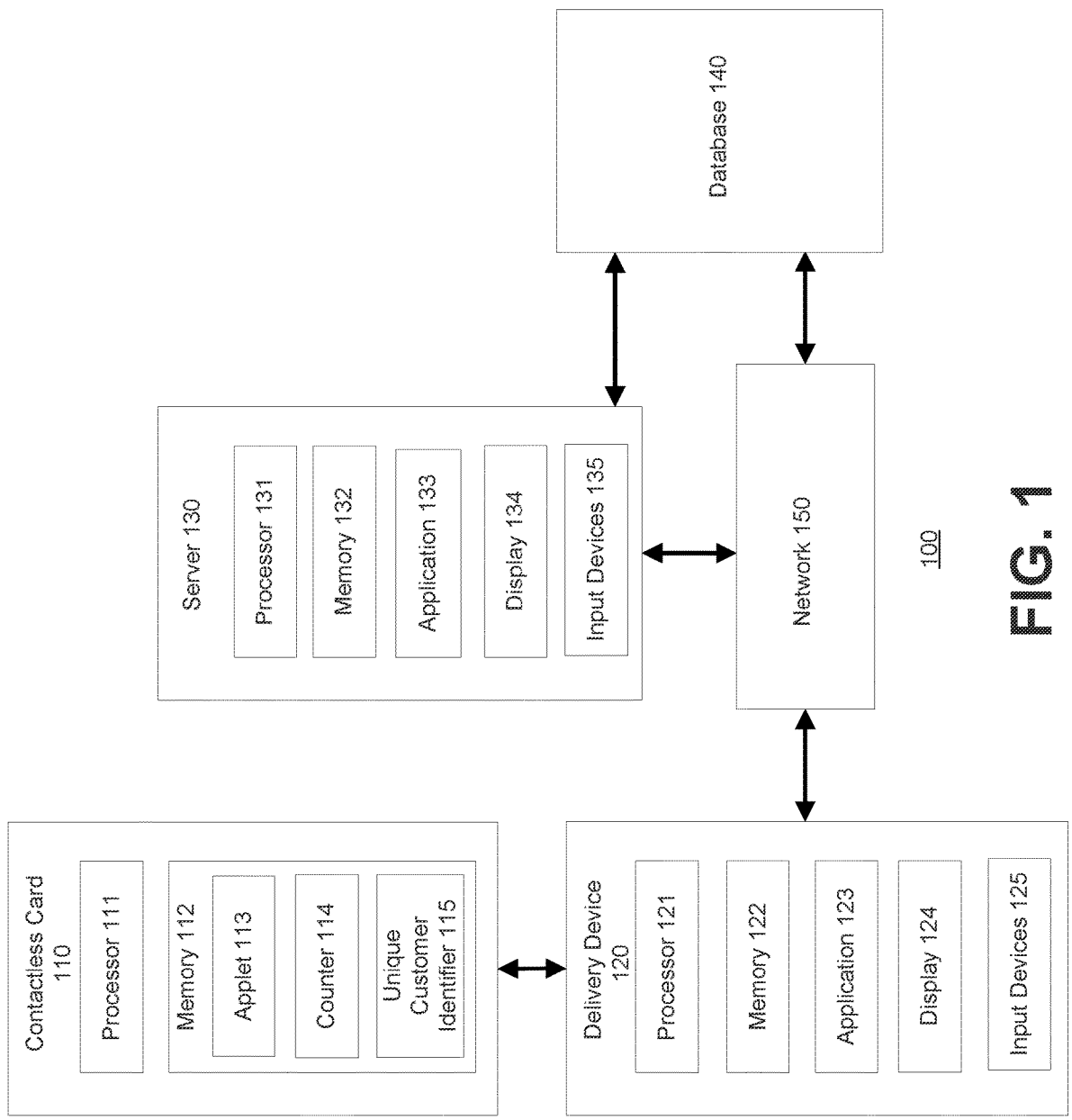
FIG. 1 is a diagram of a system for contactless delivery according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Many consumers and merchants are seeking to complete transactions efficiently, and also seeking to complete transactions in a socially distant manner where employees or other personnel do not have to come into close physical proximity with consumers. This is particularly true during times when many people are concern about spreading germs, such as during a pandemic, and accordingly new ways are needed to interact and complete transactions without bringing people into close proximity with each other. This can be difficult because people depend heavily on physical evidence of identity (e.g., driver license, physical signature, birth certificate, passport, etc.) to verify their identity. Moreover, common forms of identification, such as photographic identification and physical signatures, may be outdated, may not be reliable, and may not even be particularly meaningful. In such cases, digital ways may be needed, for example, to sign for packages, show driver license for purchases, and produce car registration for an officer.

Example embodiments of the present disclosure provide systems and methods for contactless delivery. The disclosed system and method may also be used beyond the contactless package delivery, such as in a pandemic time in terms of maintaining safety for people. A contactless card or other device may be tapped to a device (e.g., a smart phone) to exchange identities at a distance. Accordingly, a delivery person can verify that they are delivering a package to the right person, and the person accepting the package can also verify that the delivery person who is delivering to them is authorized to make the delivery. In some embodiments, certified immunity documents of both the person accepting the package and the delivery person may be used to understand about the person's immunity or a company's policies around sanitation.

In some embodiments, when a contactless card or other device is tapped to a person's phone, certificates signed by an employer (e.g., a courier) can also be transferred. This transfer can be either directly from the contactless card, the person's phone, or indirectly after looking up their identity online.

In some embodiments, when a contactless card is tapped to a package delivery device, the identity of the person who taps the contactless card can be determined and verified to match the addressee of the package. This can also be implemented with host card emulation (HCE) that emulates the contactless card. The address on the package may be a loose address (stored preferences) or tight with digitally signed certificates, or may be scoped to the individual delivery transaction.

Example embodiments of the present disclosure can promote the efficiency and security of transactions, such as package pickup and delivery transactions and the purchase of goods or services subject to age restrictions, quantity restrictions, and other restrictions. In addition, the identity verification can be carried out without the need for consumers and employees or other personnel to come within close proximity to each other. Further, the identity verification can be carried out quickly, without degrading the user experience and without the need for consumers, employees, and other personnel to carry identification documents and other materials. It is understood that example embodiments of the present disclosure are applicable to a wide range of purposes where identity verification is required, including, without limitation, package pickup, package delivery, security (e.g., building or restricted area access), and travel (e.g., ticket purchases, plane or train boarding).

FIG. 1 illustrates a system 100 for contactless package delivery according to an example embodiment. As further discussed below, the system 100 may include a contactless card 110, a delivery device 120, a server 130, and a database 140 in communication using a network 150. Although FIG. 1 illustrates single instances of the components, the system 100 may include any number of components.

The contactless card 110 can be configured to transmit a cryptogram to the delivery device 120 upon tapping to the delivery device 120. The delivery device 120 may be configured to read the cryptogram from the contactless card 110 after entry of the contactless card 110 into a communication field of the delivery device 120. The delivery device 120 may then transmit the cryptogram to the server 130. The server 130 may be configured to verify the cryptogram by searching the database 140.

The contactless card 110 can perform authentication and numerous other functions that may otherwise require a user to carry a separate physical token in addition to the contactless card 110. By employing a contactless interface, the contactless card 110 may be provided with a method to interact and communicate between a user's device (such as a mobile phone or the delivery device 120) and the card itself. For example, the Europay, Mastercard, and Visa (EMV) protocol, which underlies many credit card transactions, includes an authentication process which suffices for operating systems for Android® but presents challenges for iOS®, which is more restrictive regarding near field communication (NFC) usage, as it can be used only in a read-only manner. Exemplary embodiments of the contactless card 110 described herein utilize NFC technology.

The contactless card 110, which may comprise a payment card, such as a credit card, debit card, or gift card, may be issued by a service provider displayed on the front or back of the contactless card 110. In some examples, the contactless card 110 is not related to a payment card, and may comprise, without limitation, an identification card, a membership card, and a travel card. In some examples, the contactless card 110 may comprise a dual interface contactless payment card. The contactless card 110 may comprise a substrate, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 110 may have physical characteristics compliant with the ID-1 format of the ISO/IEC 7810 standard, and the contactless card 110 may otherwise be compliant with the ISO/IEC 14443 standard. However, it is understood that the contactless card 110 according to the present disclosure may have different characteristics, and the present disclosure does not require the contactless card 110 to be implemented in a payment card.

The contactless card 110 may also include identification information displayed on the front and/or back of the contactless card 110, and a contact pad. The contact pad may be configured to establish contact with another communication device, such as a user device, smart phone, laptop, desktop, or tablet computer. The contactless card 110 may also include processing circuitry, antenna and other components. These components may be located behind the contact pad or elsewhere on the substrate. The contactless card 110 may also include a magnetic strip or tape, which may be located on the back of the contactless card 110.

The contact pad of the contactless card 110 may include processing circuitry for storing and processing information, including a processor 111 and a memory 112. It is understood that the processing circuitry may contain additional components, including processors, memories, error and parity/CRC checkers, data encoders, anticollision algorithms, controllers, command decoders, security primitives and tamperproofing hardware, as necessary to perform the functions described herein.

The memory 112 may be a read-only memory, write-once read-multiple memory or read/write memory, e.g., RAM, ROM, and EEPROM, and the contactless card 110 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 112 may be configured to store one or more applets 113, one or more counters 114, and a unique customer identifier 115. The one or more applets 113 may comprise one or more software applications configured to execute on one or more contactless cards, such as Java Card applet. However, it is understood that the one or more applets 113 are not limited to Java Card applets, and instead may be any software application operable on contactless cards or other devices having limited memory. The one or more counters 114 may comprise a numeric counter sufficient to store an integer. The unique customer identifier 115 may comprise a unique alphanumeric identifier assigned to a user of the contactless card 110, and the identifier may distinguish the user of the contactless card 110 from other contactless card users. In some examples, the customer identifier 115 may identify both a customer and an account assigned to that customer and may further identify the contactless card 110 associated with the customer's account.

The processor 111 and memory 112 elements of the foregoing exemplary embodiments are described with reference to the contact pad, but the present disclosure is not limited thereto. It is understood that these elements may be implemented outside of the contact pad or entirely separate from it, or as further elements in addition to the processor 111 and the memory 112 elements located within the contact pad.

In some examples, the contactless card 110 may comprise one or more antennas. The one or more antennas may be placed within the contactless card 110 and around the processing circuitry of the contact pad. For example, the one or more antennas may be integral with the processing circuitry and the one or more antennas may be used with an external booster coil. As another example, the one or more antennas may be external to the contact pad and the processing circuitry.

In an embodiment, the coil of contactless card 110 may act as the secondary of an air core transformer. A terminal may communicate with the contactless card 110 by cutting power or amplitude modulation. The contactless card 110 may infer the data transmitted from the terminal using the gaps in the contactless card's power connection, which may be functionally maintained through one or more capacitors. The contactless card 110 may communicate back by switching a load on the contactless card's coil or load modulation. Load modulation may be detected in the terminal's coil through interference.

As explained above, the contactless card 110 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NDEF message that comprises a cryptographically secure OTP encoded as an NDEF text tag.

The delivery device 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The delivery device 120 may include a processor 121, a memory 122, and an application 123. The processor 121 may be a processor, a microprocessor, or other processor, and the delivery device 120 may include one or more of these processors. The processor 121 may include processing circuitry, which may contain additional components, including additional processors, memories, error and parity/CRC checkers, data encoders, anti-collision algorithms, controllers, command decoders, security primitives and tamperproofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the delivery device 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as user's shopping and financial account information.

The application 123 may comprise one or more software applications, such as a package delivery application and a contactless card reading application, comprising instructions for execution on the delivery device 120. In some examples, the delivery device 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. For example, the package delivery application of the application 123 may be executed to perform retrieving information of a package delivery stored in the database 140; the contactless card reading application of the application 123 may be executed to perform communications with the contactless card 110. Such processes may be implemented in software, such as software modules, for execution by computers or other machines. The application 123 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The delivery device 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the delivery device 120 that is available and supported by the delivery device 120, such as a touch-screen, keyboard, mouse, cursor-control device, touch-screen, microphone, digital camera, video recorder or camcorder. These devices may be used to enter information and interact with the software and other devices described herein. For example, the input devices 125 may comprise a card reader. The card reader may be configured to read from and/or communicate with the contactless card 110. In conjunction with the application 123, the card reader may communicate with the contactless card 110 using short-range wireless communication (e.g., NFC).

The server 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the server 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's shopping and financial account information.

The application 133 may comprise one or more software applications comprising instructions for execution on the server 130. In some examples, the server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. For example, the application 133 may be executed to perform verifying a cryptogram. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, touch-screen, microphone, digital camera, video recorder or camcorder. These devices may be used to enter information and interact with the software and other devices described herein.

The database 140 may be one or more databases configured to store data, including without limitation, private information of users, financial accounts of users, identities of users, transactions of users, and certified and uncertified documents. The database 140 may comprise a relational database, a non-relational database, or other database implementations, and any combination thereof, including a plurality of relational databases and non-relational databases. In some examples, the database 140 may comprise a desktop database, a mobile database, or an in-memory database. Further, the database 140 may be hosted internally by the server 130 or may be hosted externally of the server 130, such as by a server, by a cloud-based platform, or in any storage device that is in data communication with the server 130.

The system 100 may include one or more networks 150. In some examples, the network 150 may be one or more of a wireless network, a wired network or any combination of wireless network and wired network, and may be configured to connect the delivery device 120, the server 130, and the database 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the delivery device 120, server 130, and the database 140 using the network 150 can occur using one or more front channels and one or more secure back channels. A front channel may be a communication protocol that employs a publicly accessible and/or unsecured communication channel such that a communication sent to the delivery device 120, server 130, and/or database 140 may originate from any other device, whether known or unknown to the delivery device 120, server 130, and/or database 140, if that device possesses the address (e.g., network address, Internet Protocol (IP) address) of the delivery device 120, server 130, and/or database 140. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the delivery device 120, server 130, and/or database 140 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

In some examples, the contactless card 110 may be associated with a user and can be used by that user, for example, a customer to whom a package is delivered. The delivery device 120 can be associated with a package delivery person and may be operated by that person, such as a delivery person of a courier. The server 130 can be associated with a financial institution, such as a bank or a credit card company that offers financial services to the user of the contactless card 110. The contactless card 110 may be issued by the financial institution. However, it is understood that the present disclosure encompasses any entities, and is not limited to financial institutions.

Figure 2:
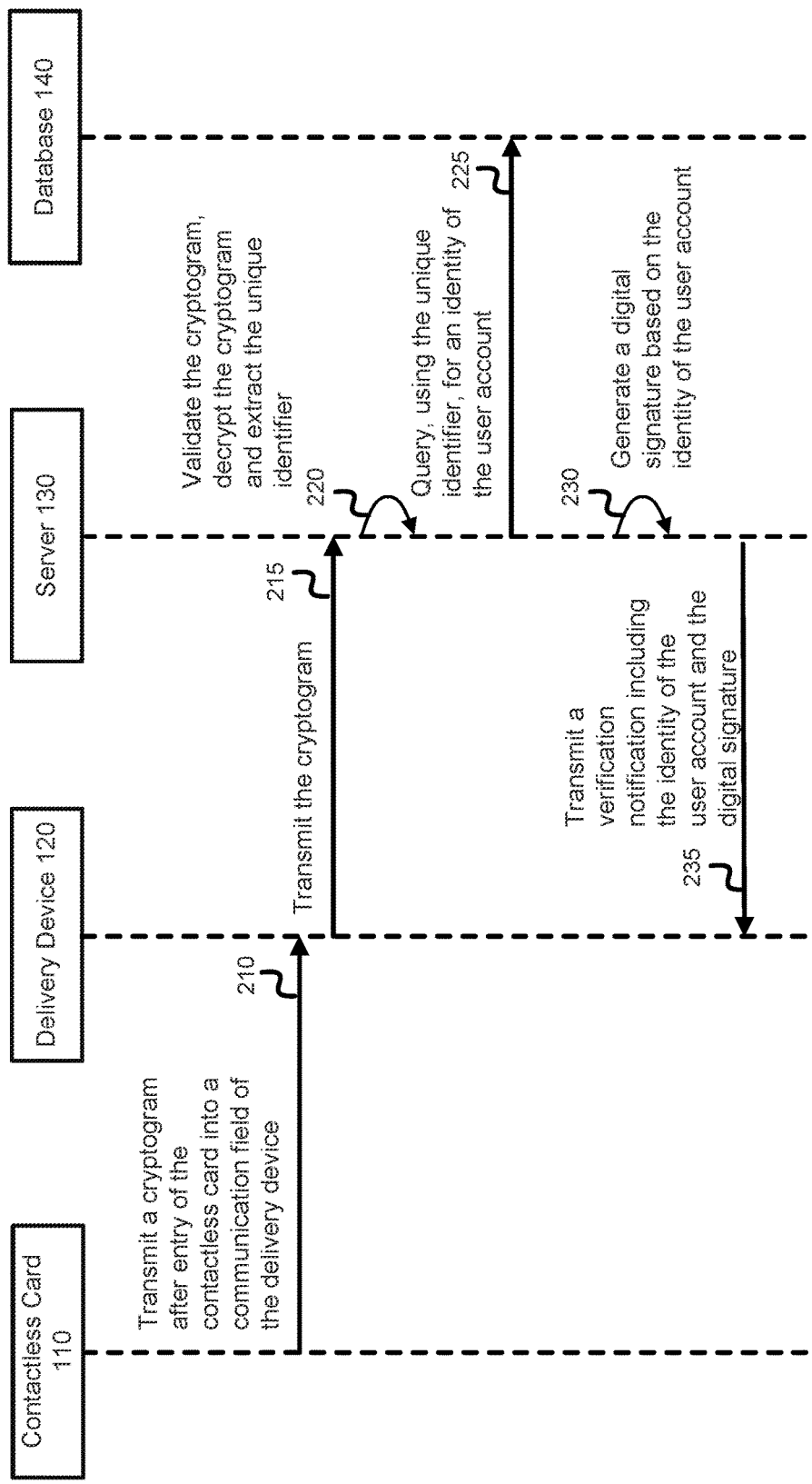
FIG. 2 is a sequence chart illustrating a method of contactless delivery according to an example embodiment.

FIG. 2 illustrates a sequence diagram 200 of contactless package delivery according to an example embodiment. FIG. 2 may reference the same or similar components as those illustrated in FIG. 1, including a contactless card, a delivery device, a server, a database, and a network.

In step 210, a contactless card (e.g., the contactless card 110) transmits a cryptogram after entry of the contactless card into a communication field of a delivery device (e.g., the delivery device 120). The contactless card may be tapped by a user to the delivery device. The delivery device may be configured to have a card reader to read a cryptogram from the contactless card upon the tap. The card reader may comprise a communication interface to generate a communication field of the card reader. As used herein, a tap of the contactless card to the delivery device may not indicate that the contactless card is in a physical contact with the delivery device. A tap of the contactless card to the delivery device may refer to entry of the contactless card into the communication field of the card reader. The cryptogram may be stored in a memory of the contactless card. The cryptogram may be associated with a unique identifier of a user account.

In step 215, the delivery device may transmit the cryptogram to a server (e.g., the server 130). Upon reading the cryptogram from the contactless card, the delivery device transmits the cryptogram to the server via a network (e.g., the network 150). Prior to transmission, the cryptogram may be encrypted by the contactless card.

In step 220, the server validates the cryptogram, decrypts the cryptogram and extracts the unique identifier. When the server receives the cryptogram, the server may decrypt the cryptogram after verifying the cryptogram. The server may then extract the unique identifier of the user account.

In step 225, the server 130 may query, using the unique identifier, for an identity of the user account. In this step, the server communicates with a database (e.g., the database 140) for searching for the identity of the user account. The identity of the user account is stored on the database. The identity of the user account may comprise a name of the user who taps the contactless card. The user account may comprise one or more email addresses associated with the user, a phone number of the user, a mailing address of the user, and so forth. Once the identity of the user account matches the unique identifier of the user account, the user of the contactless card is verified.

In step 230, the server may generate a digital signature based on the identity of the user account. After obtaining and verifying the identity of the user account, the server may be configured to generate a digital signature of the identity. The digital signature may be a signature of the user name or other signatures associated with the user name.

In step 235, the server may transmit a verification notification including the identity of the user account and the digital signature to the delivery device. The verification notification may indicate that the user of the contactless card has been verified, what the identity of the user is, and the digital signature of the identity.

When the delivery device receives the verification notification, the delivery device may display the verification notification on the display of the delivery device. The delivery device may be configured to sign a package receipt document using the digital signature.

Figure 3:
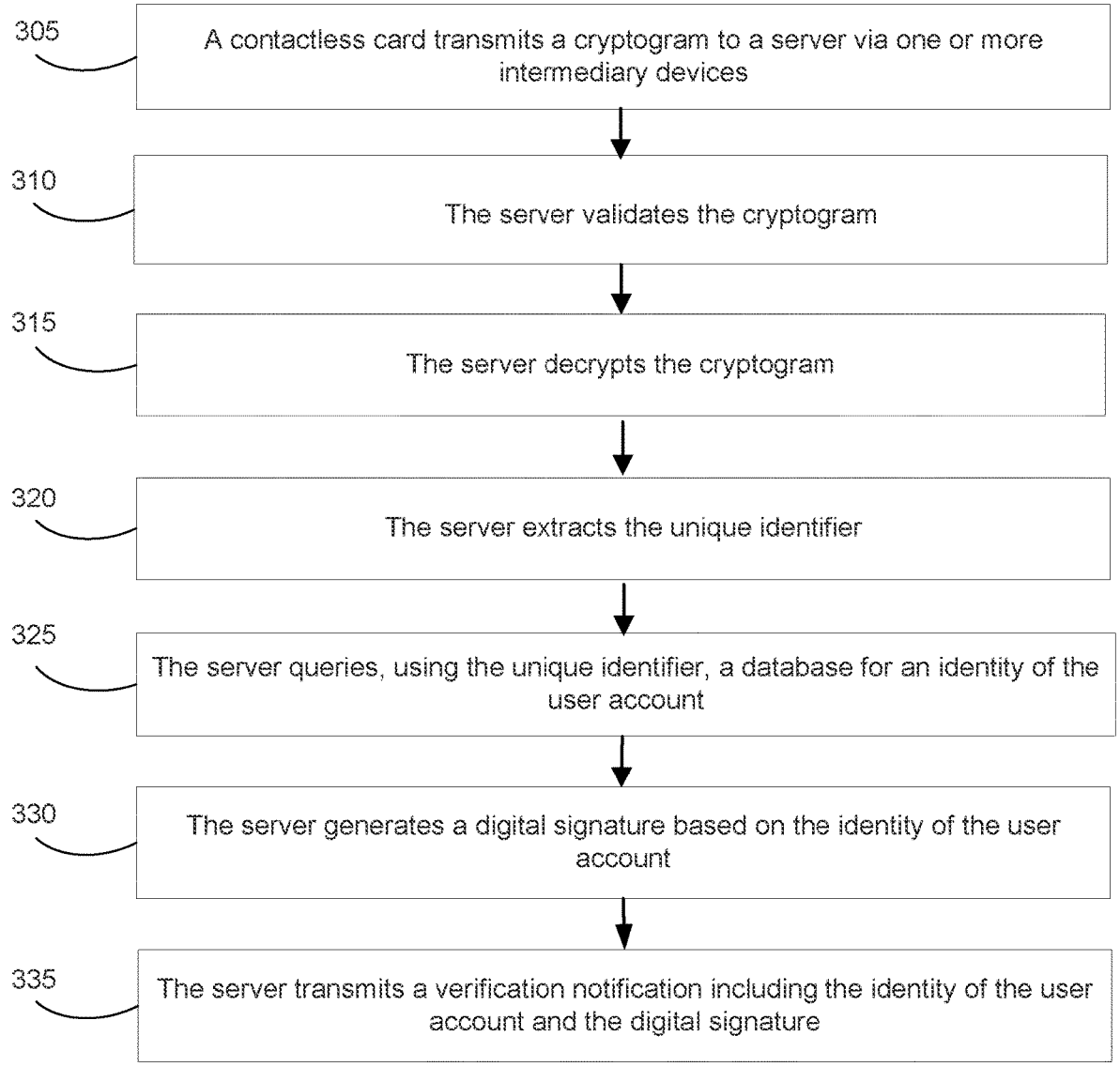
FIG. 3 is a flow chart illustrating a method of contactless delivery according to an example embodiment.

FIG. 3 illustrates a flow chart for a method 300 of contactless package delivery according to an example embodiment. FIG. 3 may reference the same or similar components as those illustrated in FIG. 1 and FIG. 2, including a contactless card, a delivery device, a server, a database, and a network. The method 300 may be implemented in the system 100 and may comprise the following steps.

In step 305, a contactless card transmits a cryptogram to a server via one or more intermediary device. As used herein, the contactless card, which may comprise a payment card, such as a credit card, debit card, or gift card, issued by a service provider displayed on the front or back of the contactless card. In some examples, the contactless card is not related to a payment card, and may comprise, without limitation, an identification card. In some examples, the payment card may comprise a dual interface contactless payment card. The contactless card may store the cryptogram in its memory and transmit the cryptogram to the server upon being tapped to the one or more intermediary device. The one or more intermediary device may comprise a delivery device (e.g., the delivery device 120).

The cryptogram may contain a unique identifier associated with a user/customer account. The cryptogram may further contain a counter value and a plurality of keys, and the processor of the contactless card is configured to generate the cryptogram using the counter value, the plurality of keys, and the unique identifier.

The counter value may be updated by the contactless card with every conversation between the contactless card and the one or more intermediary device.

For example, the contactless card communicates with the one or more intermediary device after being brought near the contactless card. Communication between the one or more intermediary device and the contactless card may involve the contactless card being sufficiently close to a card reader of the one or more intermediary device to enable near field communication (NFC) data transfer between the one or more intermediary device and the contactless card.

In other embodiments, the contactless card may communicate with the intermediary device through other means including, but not limited to, Bluetooth, satellite, Wi-Fi, wired communications, and/or any combination of wireless and wired connections. According to some embodiments, the contactless card may be configured to communicate with the card reader of the intermediary device through NFC when the contactless card is within range of card reader. In other examples, communications with the contactless card may be accomplished through a physical interface, e.g., a universal serial bus interface or a card swipe interface.

In step 310, the server validates the cryptogram. In some examples, the cryptogram may be a message authentication code (MAC) cryptogram. The MAC cryptogram may be created from a message including a shared secret. The server may generate an additional MAC cryptogram based on the shared secret, and compare the additional MAC cryptogram with the MAC cryptogram received from the contactless card. If the additional MAC cryptogram matches with the MAC cryptogram received from the contactless card, the MAC cryptogram received from the contactless card is validated.

In some embodiments, each time the contactless card is read, the counter value is transmitted to the server. This may be done in order to determine whether the counter value is equal to a counter value maintained by the server for validation and security purposes. The one or more counters may be configured to prevent a replay attack. For example, if the cryptogram has been obtained and replayed, that cryptogram is immediately rejected if the counter has been read or used or otherwise passed over. If the counter has not been used, it may be replayed. In some examples, the counter value that is updated on the contactless card is different from the counter that is updated for transactions. In some examples, the contactless card may comprise a first applet, which may be a transaction applet, and a second applet. Each applet may comprise a counter.

In some examples, the counter may get out of sync between the contactless card and the server. For example, the contactless card may be activated causing the counter to be updated and a new communication to be generated by the contactless card, but the communication may be not be transmitted for processing at the server. This may cause the counter of the contactless card and the counter maintained at the server to get out of sync. This may occur unintentionally including, for example, where a contactless card is stored adjacent to a device (e.g., carried in a pocket with a device) and where the contactless card is read at an angle may include the card being misaligned or not positioned such that the contactless card is powered up an the NFC field but is not readable. If the contactless card is positioned adjacent to a device, the device's NFC field may be turned on to power the contactless card causing the counter therein to be updated, but no application on the device receives the communication.

To keep the counter in sync, an application, such as a background application, may be executed that would be configured to detect when the intermediary device wakes up and synchronize with the server indicating that a read that occurred due to detection to then move the counter forward. Since the counters of the contactless card and the server may get out of sync, the server may be configured to allow the counter of the contactless card to be updated a threshold or predetermined number of times before it is read by the server and still be considered valid. For example, if the counter is configured to increment (or decrement) by one for each occurrence indicating activation of the contactless card, the server may allow any counter value it reads from the contactless card as valid, or any counter value within a threshold range (e.g., from 1 to 10). Moreover, the server may be configured to request a gesture associated with the contactless card, such as a user tap, if it reads a counter value which has advanced beyond 10, but below another threshold range value (such as 1000). From the user tap, if the counter value is within a desired or acceptance range, authentication succeeds.

In step 315, the server decrypts the cryptogram. The cryptogram may be encrypted by the contactless card prior to transmission to the server. The cryptogram may be encrypted using one or more cryptographic algorithms which may comprise at least one of a symmetric encryption algorithm, a hash-based message authentication code (HMAC) algorithm, and a cipher-based message authentication code (CMAC) algorithm. The server may decrypt the cryptogram using the one or more cryptographic algorithms.

In step 320, the server extracts the unique identifier from the decrypted cryptogram. The unique identifier may comprise a unique alphanumeric identifier assigned to a user of the contactless card. The unique identifier may distinguish the user of the contactless card from other contactless card users. In some examples, the unique identifier may identify both a customer and an account assigned to that customer and may further identify the contactless card associated with the customer's account.

In step 325, the server queries, using the unique identifier, a database for an identity of the user account. In some embodiments, the unique identifier that is cryptographically secure and not susceptible to interception may be transmitted to one or more backend services. The unique identifier may be configured to look up secondary information about individual. The secondary information may comprise personally identifiable information about the user (e.g., an identity of the user). In some examples, the secondary information may be stored within the contactless card.

In step 330, the server generates a digital signature based on the identity of the user account. After verifying and retrieving the identity of the user account, the server may generate a digital signature of the user using the identity. The identity of the user may be the name of the user. The digital signature can a signature in any suitable form.

In step 335, the server transmits a verification notification including the identity of the user account and the digital signature to the delivery device. The verification notification may indicate that the user/customer who tapped the contactless card to the delivery device has been verified. When receiving the verification notification, the delivery device may display the verification notification on a display of the delivery device. The delivery device may display the digital signature next to the user/customer name to whom the package is delivered. This digital signature may be considered as an authorization and verification for releasing the package to the user.

Figure 4:
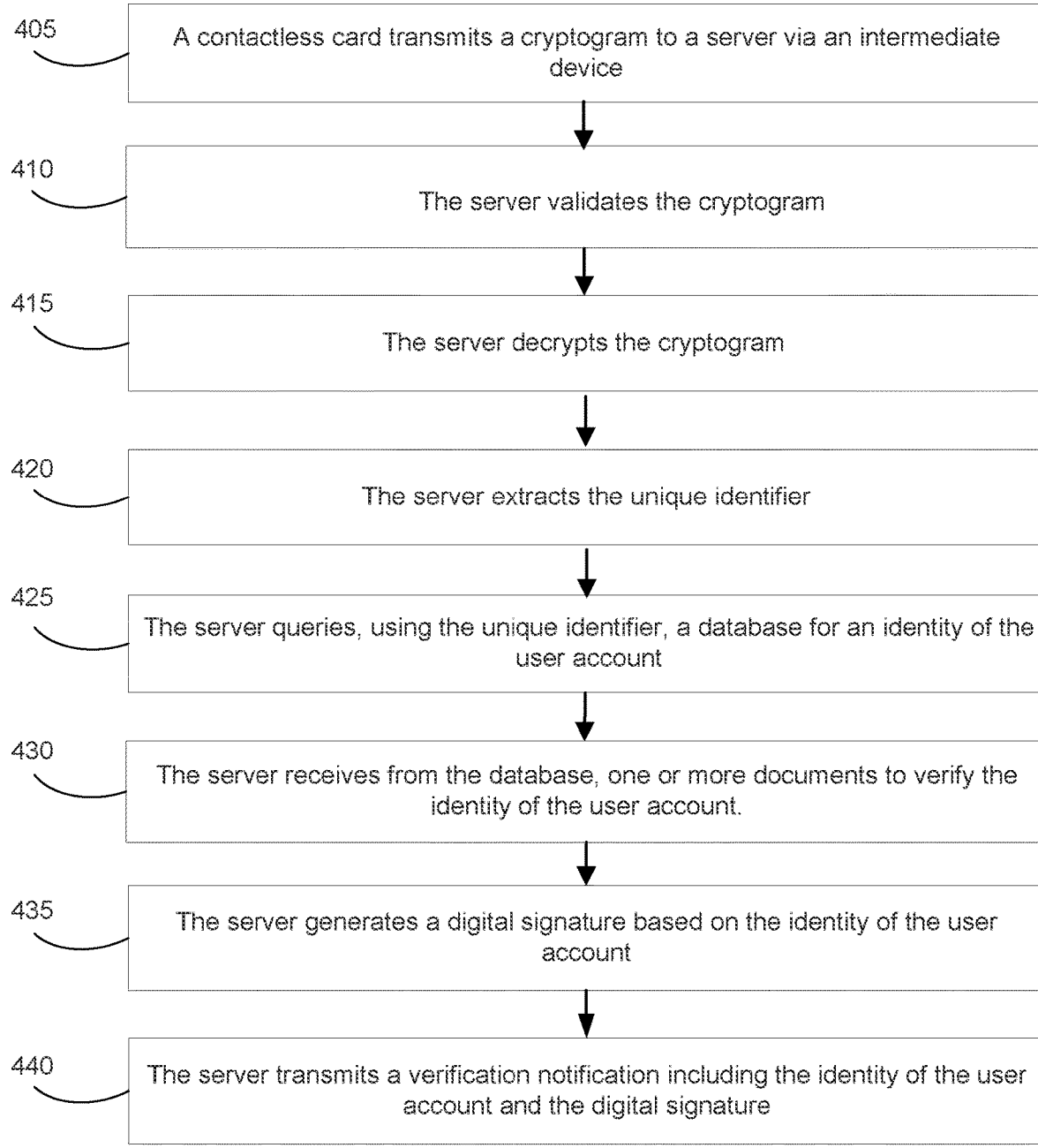
FIG. 4 is a flow chart illustrating a method of contactless delivery according to an example embodiment.

FIG. 4 illustrates a flow chart for a method 400 of contactless package delivery according to an example embodiment. FIG. 4 may reference the same or similar components as those illustrated in FIGS. 1-3, including a contactless card, a delivery device, a server, a database, and a network. The method 400 may comprise the following steps.

In some embodiments, one or more authentication factors may be used to verify an identity of the user in addition to the unique identifier of the user account. The one or more authentication factors may be any suitable factors as described below.

In step 405, a contactless card transmits a cryptogram to a server via one or more intermediary devices. The contactless card may store the cryptogram in its memory and transmit the cryptogram to the server upon being tapped to the one or more intermediary device. The cryptogram may contain a unique identifier associated with a user/customer account. The one or more intermediary device may comprise a delivery device (e.g., the delivery device 120).

In step 410, the server validates the cryptogram. The cryptogram may be a MAC cryptogram. The MAC cryptogram may be created from a message including a shared secret. The server may generate an additional MAC cryptogram based on the shared secret, and compare the additional MAC cryptogram with the MAC cryptogram received from the contactless card. If the additional MAC cryptogram matches with the MAC cryptogram received from the contactless card, the MAC cryptogram received from the contactless card is validated.

In step 415, the server decrypts the cryptogram. The cryptogram may be encrypted using one or more cryptographic algorithms prior to transmission to the server. The server may decrypt the cryptogram using the one or more cryptographic algorithms.

In step 420, the server extracts the unique identifier. The unique identifier may be used to distinguish the user of the contactless card from other contactless card users. The unique identifier may identify both a customer and an account assigned to that customer and may further identify the contactless card associated with the customer's account.

In step 425, the server queries, using the unique identifier, a database for an identity of the user account. The unique identifier may be configured to look up secondary information about an individual. The secondary information may comprise personally identifiable information about the user (e.g., an identity of the user).

In step 430, the server receives from the database, one or more documents to verify the identity of the user account. The one or more documents may be stored in the database. In other embodiments, the one or more documents may be stored in the contactless card and are transmitted to the server when the contactless card is read by the intermediary device (e.g., the delivery device). In other embodiments, the one or more documents may be stored in the delivery device and are transmitted to the server along with the cryptogram when the contactless card is read by the delivery device.

The one or more documents may be certified documents, such as certificates signed by an employer (e.g., a courier). The one or more documents may also induce information on a delivery package stored on the delivery device, which may be transmitted to the server by the delivery device as an authentication factor for verifying the identity of the user. The information on the delivery package may include the name of the user, a delivery address of the user, a phone number of the user, and so forth. The one or more documents may also be uncertified documents such as a copy of a driver license of the user. In some embodiments, the one or more documents may include a profile picture of the user account, which can be transmitted to the server for verifying the identity of the user account.

In step 435, the server generates a digital signature based on the identity of the user account. The identity of the user may be the name of the user. The digital signature can a signature in any suitable form.

In step 440, the server transmits a verification notification including the identity of the user account and the digital signature. When receiving the verification notification, the delivery device may display the digital signature next to the user/customer name to whom the package is delivered. This digital signature may be considered as an authorization and verification for releasing the package to the user.

Figure 5:
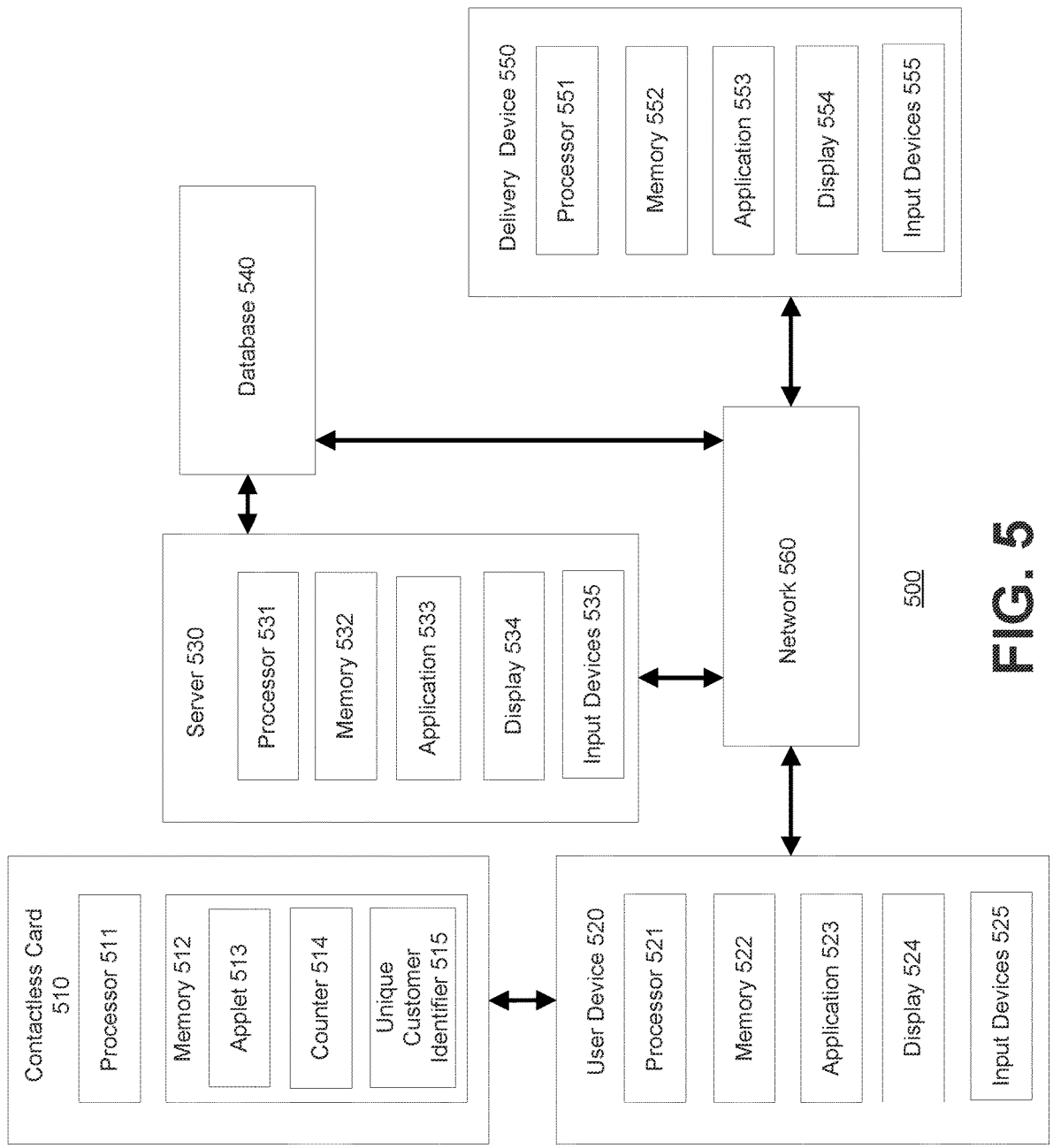
FIG. 5 is a diagram of a system for contactless delivery according to an example embodiment.

Unlike the system 100 in FIG. 1, in some embodiments, the intermediary device may be a user device other than the delivery device. The contactless card may be tapped to the user device that transmits the cryptogram to the server. The delivery device can receive the verification notification. FIG. 5 illustrates such a system 500 of contactless package delivery according to an example embodiment. As further discussed below, the system 500 may include a contactless card 510, a user device 520, a server 530, a database 540, and a delivery device 550 in communication using a network 560. Although FIG. 5 illustrates single instances of the components, the system 500 may include any number of components.

The contactless card 510 can be configured to transmit a cryptogram to the user device 520 upon tapping to the user device 520. The user device 520 may be configured to read the cryptogram from the contactless card 510 after entry of the contactless card 510 into a communication field of the user device 520. The user device 520 may then transmit the cryptogram to the server 530. The server 530 may be configured to verify the cryptogram by searching the database 540. The server 530 may transmit a verification notification including a digital signature to the delivery device 550.

The contactless card 510 can include processing circuitry for storing and processing information, including a microprocessor 511 and a memory 512. The memory 512 may be configured to store one or more applets 513, one or more counters 514, and a unique customer identifier 515. In some examples, the contactless card 510 is similar to the contactless card 110 in FIG. 1.

The user device 520 may be a network-enabled computer device. The user device 520 may include a processor 521, a memory 522, and an application 523. The application 523 may comprise one or more software applications, such as a contactless card reading application, comprising instructions for execution on the user device 520. The user device 520 may further include a display 524 and input devices 525.

The user device 520 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 520 may include a processor 521, a memory 522, and an application 523. The processor 521 may be a processor, a microprocessor, or other processor, and the user device 520 may include one or more of these processors. The processor 521 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 521 may be coupled to the memory 522. The memory 522 may be a read-only memory, write-once read-multiple memory or read/write memory, e.g., RAM, ROM, and EEPROM, and the user device 520 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 522 may be configured to store one or more software applications, such as the application 523, and other data, such as user's shopping and financial account information.

The application 523 may comprise one or more software applications, such as a package delivery application and a contactless card reading application, comprising instructions for execution on the user device 520. In some examples, the user device 520 may execute one or more applications, such as software applications, that enable, for example, network communications with one or more components of the system 500, transmit and/or receive data, and perform the functions described herein. Upon execution by the processor 521, the application 523 may provide the functions described in this specification, specifically to execute and perform the steps and functions in the process flows described below. For example, the package delivery application of the application 523 may be executed to perform retrieving information of a package delivery stored in the database 540; the contactless card reading application of the application 523 may be executed to perform communications with the contactless card 510. Such processes may be implemented in software, such as software modules, for execution by computers or other machines. The application 523 may provide GUIs through which a user may view and interact with other components and devices within the system 500. The GUIs may be formatted, for example, as web pages in HyperText Markup Language (HTML), Extensible Markup Language (XML) or in any other suitable form for presentation on a display device depending upon applications used by users to interact with the system 500.

The user device 520 may further include a display 524 and input devices 525. The display 524 may be any type of device for presenting visual information such as a computer monitor, a flat panel display, and a mobile device screen, including liquid crystal displays, light-emitting diode displays, plasma panels, and cathode ray tube displays. The input devices 525 may include any device for entering information into the user device 520 that is available and supported by the user device 520, such as a touch-screen, keyboard, mouse, cursor-control device, touch-screen, microphone, digital camera, video recorder or camcorder. These devices may be used to enter information and interact with the software and other devices described herein. For example, the input devices 525 may comprise a card reader. The card reader may be configured to read from and/or communicate with the contactless card 510. In conjunction with the application 523, the card reader may communicate with the contactless card 510 using short-range wireless communication (e.g., NFC).

The server 530 may be a network-enabled computer device. The server 530 may include a processor 531, a memory 532, and an application 533. The server 530 may further include a display 534 and input devices 535. In some examples, the server 530 is similar to the server 130 in FIG. 1.

The database 540 may be one or more databases configured to store data, including without limitation, private information of users, financial accounts of users, identities of users, transactions of users, and certified and uncertified documents. In some examples, the database 540 is similar to the database 140 in FIG. 1.

The delivery device 550 may be a network-enabled computer device. The delivery device 550 may include a processor 551, a memory 552, and an application 553. The delivery device 550 may further include a display 554 and input devices 555. In some example, the delivery device 550 is similar to the delivery device 120 in FIG. 1.

The system 500 may include one or more networks 560. The one or more networks 560 are similar to the networks 150 in FIG. 1.

In some examples, the contactless card 510 may be associated with a user and can be used by that user, for example, a customer to whom a package is delivered. The user device 520 may be associated with the user that owns the contactless card 510. The server 530 can be associated with a financial institution, such as a bank or a credit card company that offers financial services to the user of the contactless card 510. The contactless card 510 may be issued by the financial institution. The delivery device 550 can be associated with a package delivery person and may be operated by that person, such as a delivery person of a courier.

Figure 6:
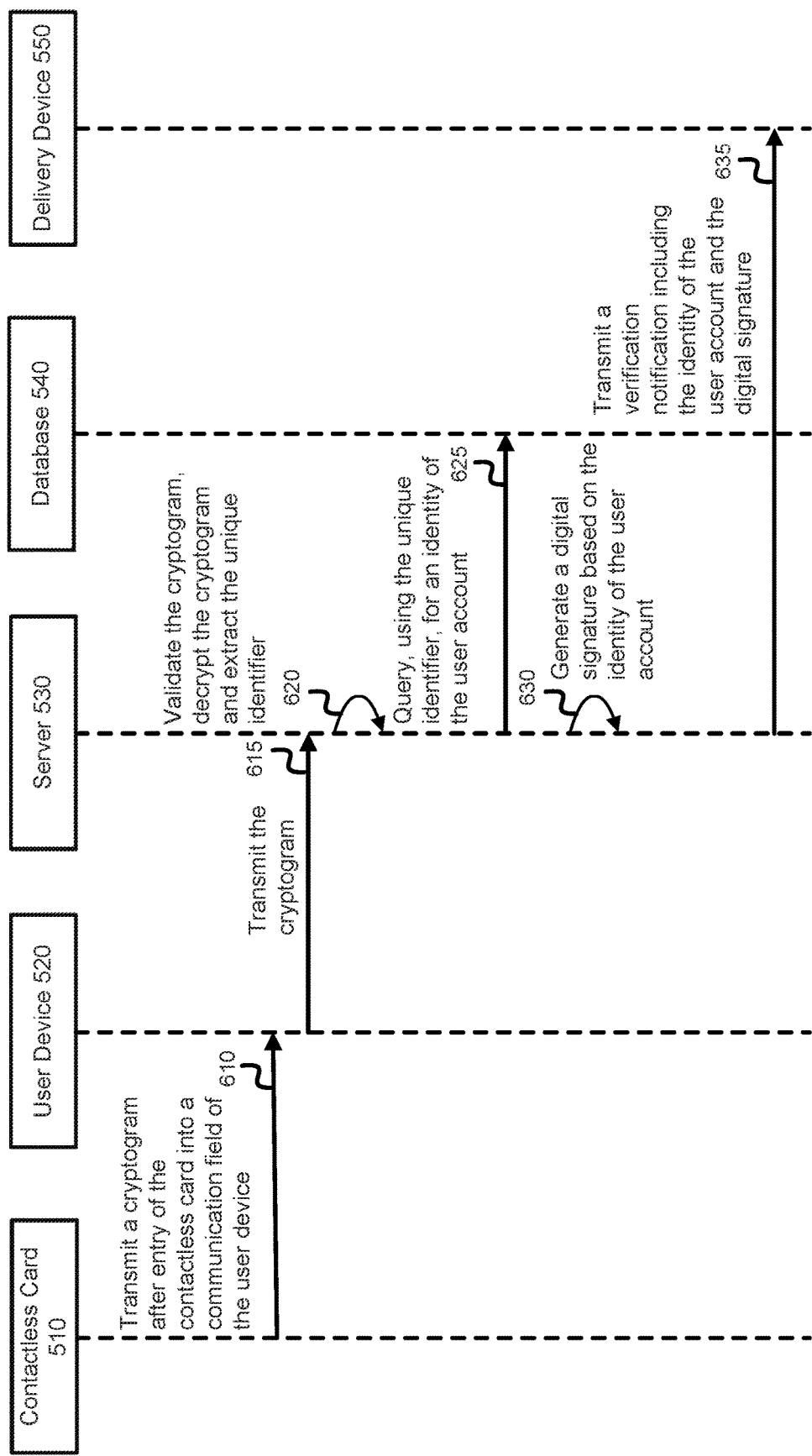
FIG. 6 is a sequence chart illustrating a method of contactless delivery according to an example embodiment.

FIG. 6 illustrates a sequence diagram 600 of contactless package delivery according to an example embodiment. FIG. 6 may reference the same or similar components as those illustrated in FIGS. 1-5, including a contactless card, a user device, a delivery device, a server, a database, and a network.

In step 610, a contactless card (e.g., the contactless card 510) transmits a cryptogram after entry of the contactless card into a communication field of a user device (e.g., the user device 520). The contactless card may be tapped by a user to the user device. The user device may be configured to have a card reader to read a cryptogram from the contactless card upon the tap. The card reader may comprise a communication interface to generate a communication field of the card reader. As used herein, a tap of the contactless card to the user device may not indicate that the contactless card is in a physical contact with the user device. A tap of the contactless card to the user device may refer to entry of the contactless card into the communication field of the card reader. The cryptogram may be stored in a memory of the contactless card. The cryptogram may be associated with a unique identifier of a user account.

In step 615, the user device may transmit the cryptogram to a server (e.g., the server 530). Upon reading the cryptogram from the contactless card, the user device transmits the cryptogram to the server via a network (e.g., the network 560). Prior to transmission, the cryptogram may be encrypted by the contactless card.

In step 620, the server validates the cryptogram, decrypts the cryptogram and extracts the unique identifier. When the server receives the cryptogram, the server may decrypt the cryptogram after verifying the cryptogram. The server may then extract the unique identifier of the user account.

In step 625, the server may query, using the unique identifier, for an identity of the user account. In this step, the server communicates with a database (e.g., the database 540) for searching for the identity of the user account. The identity of the user account is stored on the database. The identity of the user account may comprise a name of the user who taps the contactless card. The user account may comprise one or more email addresses associated with the user, a phone number of the user, a mailing address of the user, and so forth. Once the identity of the user account matches the unique identifier of the user account, the user of the contactless card is verified.

In step 630, the server may generate a digital signature based on the identity of the user account. After obtaining and verifying the identity of the user account, the server may be configured to generate a digital signature of the identity. The digital signature may be a signature of the user name or other signatures associated with the user name.

In step 635, the server may transmit a verification notification including the identity of the user account and the digital signature to the delivery device. The verification notification may indicate that the user of the contactless card has been verified, what the identity of the user is, and the digital signature of the identity. When the delivery device receives the verification notification, the delivery device may display the verification notification on the display of the delivery device. The delivery device may be configured to sign a package receipt document using the digital signature.

Figure 7:
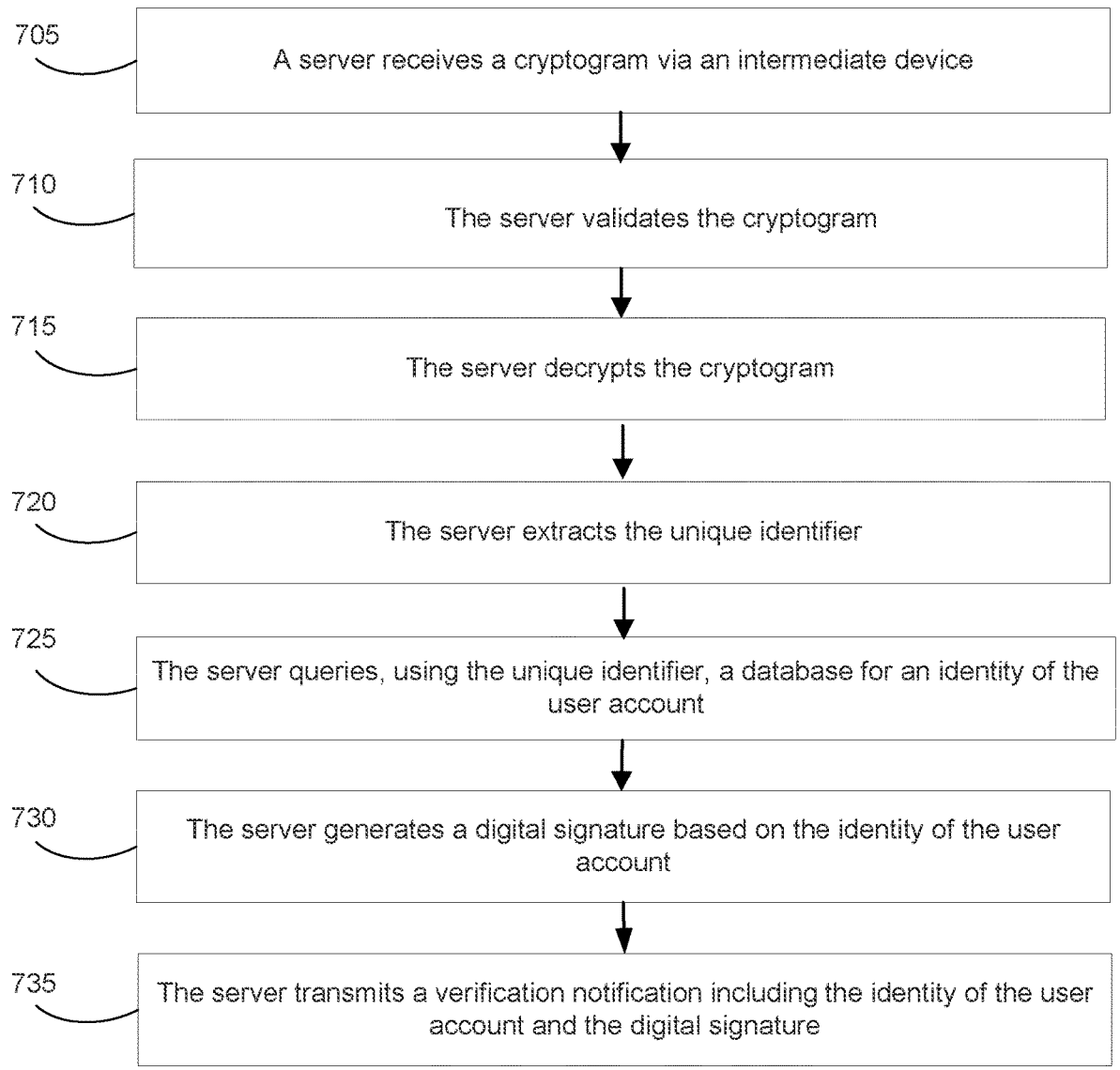
FIG. 7 is a flow chart illustrating a method of contactless delivery according to an example embodiment.

FIG. 7 illustrates a flow chart for a method 700 of contactless package delivery according to an example embodiment. FIG. 7 may reference the same or similar components as those illustrated in FIGS. 1-6, including a contactless card, a user device, a delivery device, a server, a database, and a network. The method 700 may be implemented in the system 500 and may comprise the following steps.

In step 705, a contactless card transmits a cryptogram to a server via an intermediary device. The intermediary device may comprise a user device (e.g., the user device 520). Communication between the user device and the contactless card may involve the contactless card being sufficiently close to a card reader of the user device to enable near field communication (NFC) data transfer between the user device and the contactless card.

In step 710, the server validates the cryptogram. In step 715, the server decrypts the cryptogram. In step 720, the server extracts the unique identifier from the decrypted cryptogram. In step 725, the server queries, using the unique identifier, a database (e.g., the database 540) for an identity of the user account. In step 730, the server generates a digital signature based on the identity of the user account. The steps 705-730 are similar to the steps 305-330 in FIG. 3. Details of the steps 705-730 are not repeated herein.

In step 735, the server transmits a verification notification including the identity of the user account and the digital signature to the delivery device. The verification notification may indicate that the user/customer who tapped the contactless card to the user device has been verified. When receiving the verification notification, the delivery device may display the verification notification on a display of the delivery device. The delivery device may display the digital signature next to the user/customer name to whom the package is delivered. This digital signature may be considered as an authorization and verification for releasing the package to the user.

Figure 8:
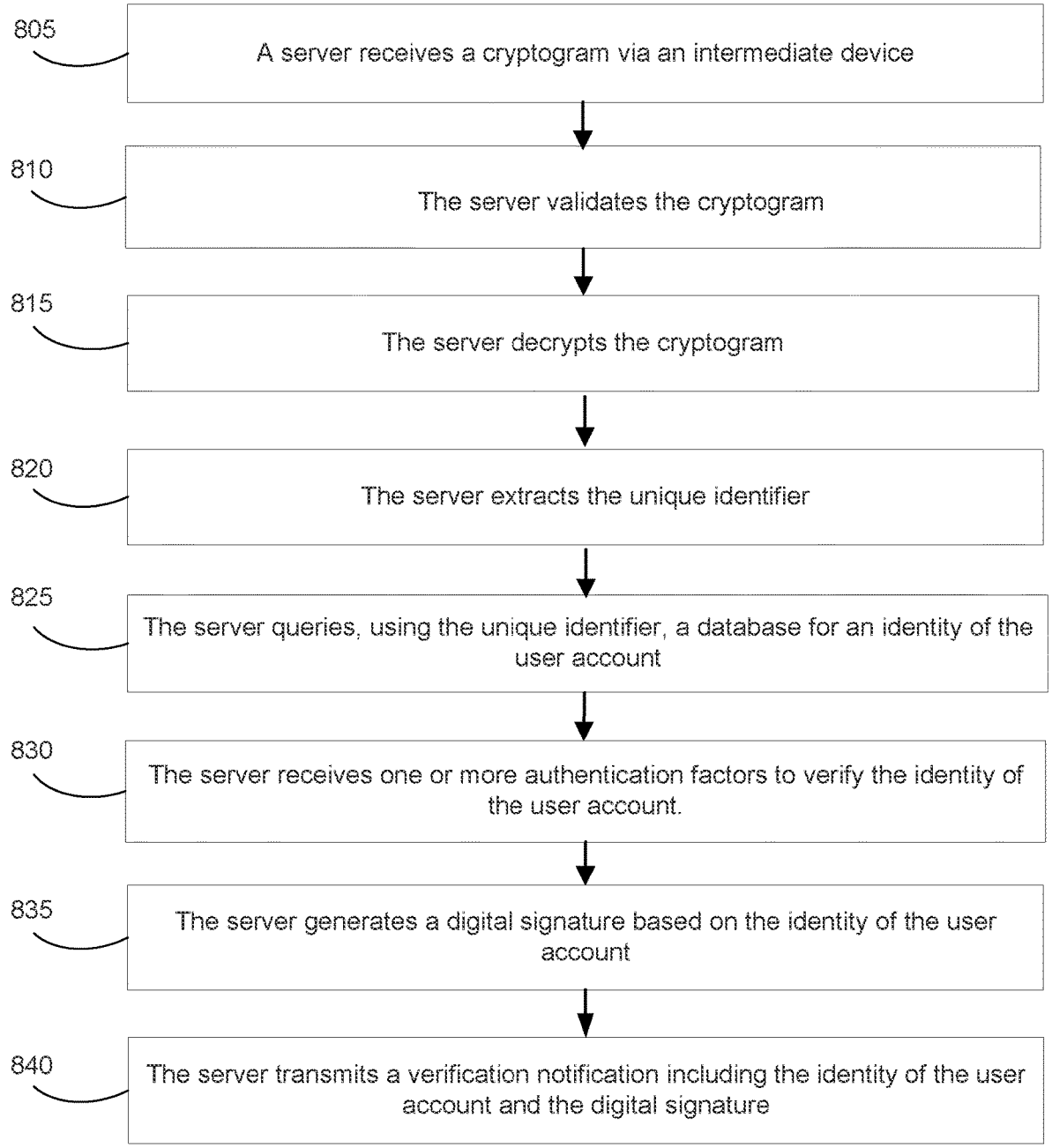
FIG. 8 is a flow chart illustrating a method of contactless delivery according to an example embodiment.

In some embodiments, one or more authentication factors may be used to verify the identity of the user/user account in addition to the unique identifier as used in FIG. 7. FIG. 8 illustrates a flow chart for a method 800 of contactless package delivery according to an example embodiment. In the method 800, one or more authentication factors may be used to verify the identity of the user/user account. FIG. 8 may reference the same or similar components as those illustrated in FIGS. 1-7, including a contactless card, a user device, a delivery device, a server, a database, and a network. The method 800 may be implemented in the system 500 and may comprise the following steps.

The method 800 may include: a contactless card transmits a cryptogram to a server via an intermediate device (the user device 520; step 805); the server validates the cryptogram (step 810); the server decrypts the cryptogram (step 815); the server extracts the unique identifier (step 820); the server queries, using the unique identifier, a database for an identity of the user account (step 825); the server receives from the database, one or more authentication factors to verify the identity of the user account (step 830); the server generates a digital signature based on the identity of the user account (step 835); and the server transmits a verification notification including the identity of the user account and the digital signature (step 840). The steps 805-825 and 835-840 are similar to the corresponding steps 705-725 and 730-735, details of which are not repeated herein.

In step 830, the one or more authentication factors may be provided by the user device 520 and/or the delivery device 550. For example, the user device 520 may transmit to the server a geo-signature of the user device 520; and the delivery device 550 may transmit to the server a geo-signature of the delivery device 550. The server may compare the geo-signature of the user device with the geo-signature of the delivery device, and generate the digital signature based on the comparison.

The one or more authentication factors may also comprise at least one selected from the group of a password, a personal identification (PIN), and a biometric feature. The server may verify the identity of the user account based on the one or more authentication factors.

Figure 9:
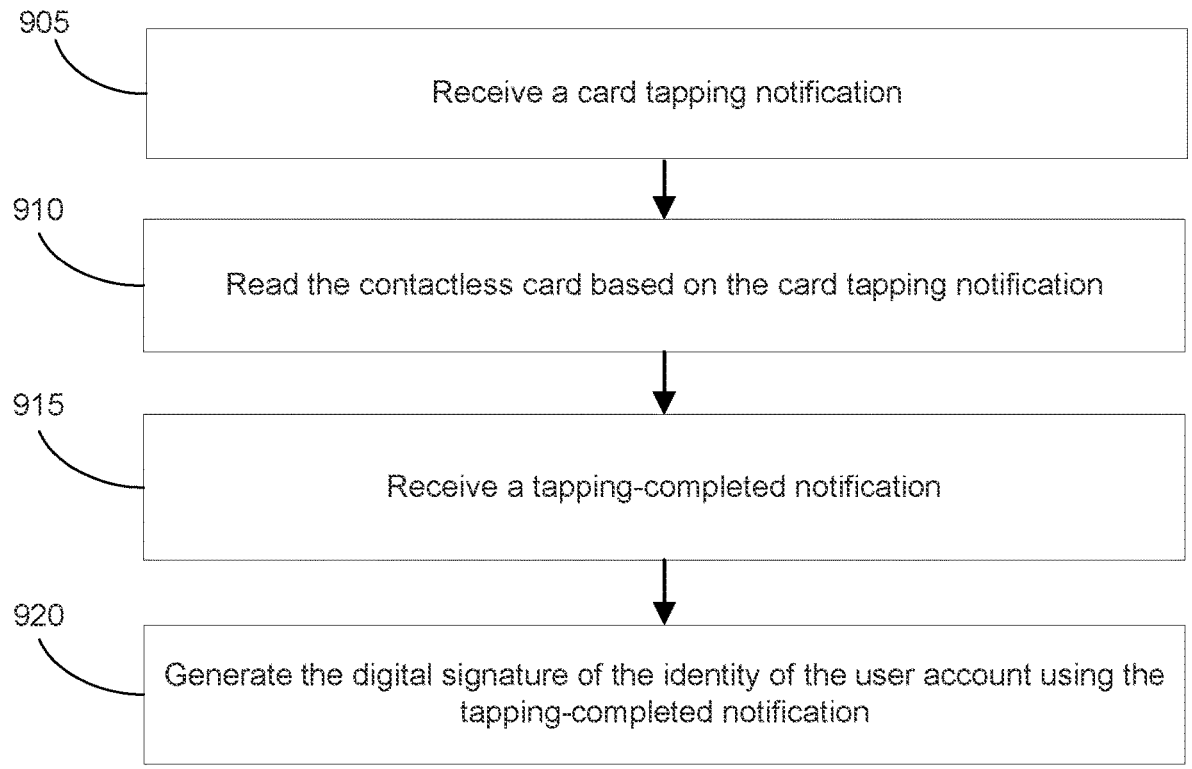
FIG. 9 is a flow chart illustrating a method of contactless delivery according to an example embodiment.

In some embodiments, the delivery device 550 may transmit a card tapping notification through the server to the user device 520. For example, when a package delivery person is approaching or at a package pickup location (e.g., the user's home address/the package delivery address), the delivery person may operate the delivery device to transmit a card tapping notification to the user device. When receiving the card tapping notification, the user may tap the contactless card to the user device. FIG. 9 describes a method 900 of contactless package delivery based on a card tapping notification according to an example embodiment. FIG. 9 may reference the same or similar components as those illustrated in FIGS. 1-8, including a user device, a server, a database, and a delivery device.

In step 905, the server may receive a card tapping notification. The card tapping notification may be initiated by the delivery device and transmitted to the server. Upon receiving the card tapping notification, the server may forward/transmit the card tapping notification to the user device and prompt to read the contactless card. The user of the user device may then tap the contactless card to the user device in accordance with the card tapping notification.

In step 910, the server may read the contactless card based on the card tapping notification. For example, after the contactless card being tapped to the user device, the user device may receive a cryptogram from the contactless card and then transmit the cryptogram to the server.

In step 915, the server may receive a tapping-completed notification from the user device. After the contactless card being tapped, the user device may generate a card tapping-completed notification that is then transmitted to the server. The server may transmit the card tapping-completed notification to the delivery device, such that the delivery person is informed that the contactless card has been tapped to the user device.

In step 920, the server may generate the digital signature of the identity of the user account using the tapping-completed notification. For example, the cryptogram may be verified by the server and the identity of the user account may be retrieved by the server, as described above. The server may further verify the identity of the user account/user based on the card tapping-completed notification, and then generate the digital signature of the identity of the user.

Figure 10:
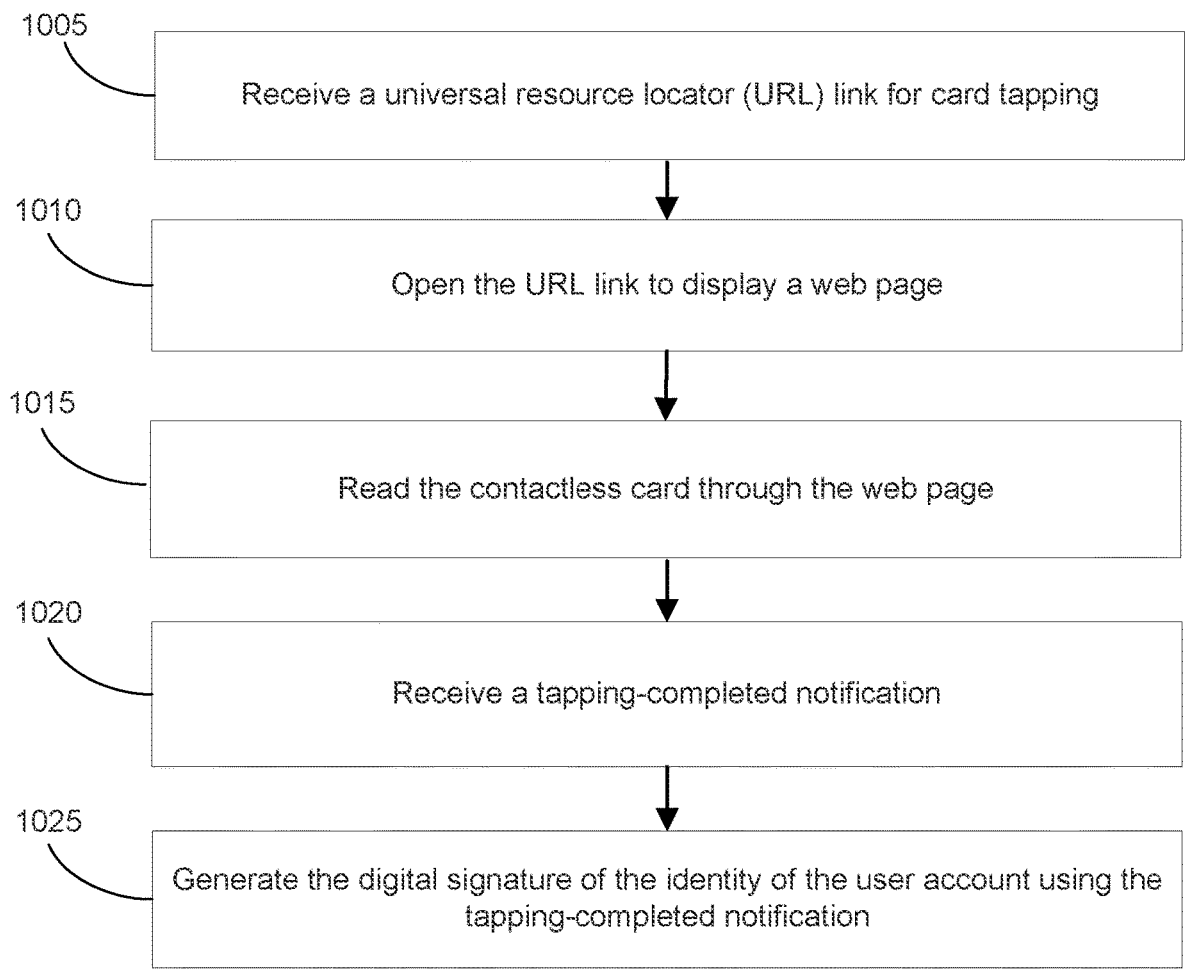
FIG. 10 is a flow chart illustrating a method of contactless delivery according to an example embodiment.

In some embodiments, the delivery device 550 may transmit a universal resource locator (URL) link for card tapping through the server to the user device 520. For example, when a package delivery person is approaching or at a package pickup location (e.g., the user's home address/the package delivery address), the delivery person may operate the delivery device to transmit a URL link for card tapping to the user device. When receiving the URL link for card tapping, the user may tap the contactless card to the user device. FIG. 10 describes a method 1000 of contactless package delivery based on a URL link for card tapping according to an example embodiment. FIG. 10 may reference the same or similar components as those illustrated in FIGS. 1-9, including a user device, a server, a database, and a delivery device.

In step 1005, the server may receive a URL link for card tapping. The URL link for card tapping may be initiated and transmitted by the delivery device to the server. Upon receiving the URL link, the server may forward/transmit the URL link to the user device.

In step 1010, the user of the user device may open the URL link to display a web page, and then tap the contactless card to the user device via the web page.

In step 1015, the server may read the contactless card. For example, after the contactless card being tapped to the user device via the web page, the user device may receive a cryptogram from the contactless card and then transmit the cryptogram to the server. For example, the web page may comprise java script, and the java script interacts with the underlying native platform of the web browser to trigger the NFC read. The web page would then take the contents of that NFC read and deliver it to the server.

In step 1020, the server may receive a tapping-completed notification from the user device. After the contactless card being tapped, the user device may generate a card tapping-completed notification via the web page that is then transmitted to the server. The server may transmit the card tapping-completed notification to the delivery device, such that the delivery person is informed that the contactless card has been tapped to the user device.

In step 1025, the server may generate the digital signature of the identity of the user account using the tapping-completed notification. For example, the cryptogram may be verified by the server and the identity of the user account may be retrieved by the server, as described above. The server may further verify the identity of the user account/user based on the card tapping-completed notification, and then generate the digital signature of the identity of the user.

In some embodiments, the contactless card may embody host card emulation. For example, the user device 520 in FIG. 5 may emulate the contactless card, as opposed to functioning as a reader for the contactless card. In this example, the user device 520 may function as the contactless card and can be tapped to other devices (e.g., the delivery device 120 or the delivery device 550). Accordingly, instead of authenticating the user through one or more second factors, the delivery device can communicate with the server to determine the identity of the user and verify against an expected delivery.

In some examples, the user device emulating the contactless card can also operate anonymously or in an identified manner, but in either case can limit personal information exposure. The delivery device may access the server using a request service for verifying the user. The server may reply with a determination indicating whether the user is verified. The delivery device may also submit the delivery address for the package to the server that can be used to match on the database the identity with the contactless card identifier.

In some embodiments, a profile picture of the user may be transmitted after tapping a contactless card. For example, when the user enters or drives towards a store, the user could tap his/her contactless card on a card reader and the contactless card may send the profile picture of the user to a store employee. The store employee may send the user a picture of himself or herself based on information that is stored with the user's profile. In this way, the user is able to recognize the store employee from across the store without a physical contact with the person. If some close interaction is required, the user and the store employee will have been informed of each other and expeditiously proceed with the interaction without passing by or encountering other people.

In some embodiments, the digital signature can be a direct or indirect signature. For example, the direct signature refers to a signature of the known recipient of the delivery package (or someone associated with the known recipient's account), and the indirect signature refers to a signature of a person other than the known recipient of the delivery package. For example, if a person who is not on the delivery package can tap his or her contactless card, his or her name can be applied as an indirect signature. If this indirect signature can satisfy the delivery condition, a notification may be sent to the known recipient of the delivery package indicating the package has been signed by that person. But if the delivery requires a direct signature, the system can require the known recipient to sign, and the known recipient who is on the delivery package can then tap his/her contactless card.

In some embodiments, multiple tapping of a contactless card may be desired to prevent a replay attack. As used herein, the replay attack may refer to the unauthorized interception of a cryptogram message and cloning of this message for use in signing for packages. For example, the cryptogram message can be read and then statically programmed into a writable NFC tag, which can provide the same cryptogram when read repeatedly (without generating a new counter).

By tapping the contactless card multiple times (e.g., twice by the user), the cryptogam messages can be verified to be genuinely generated by the contactless card even if no a second authentication factor is entered, because if the contactless card is tapped multiple times, then the server has multiple successive cryptogram messages to compare. In this way, the multiple successive cryptogram messages can be validated that they were actually generated by the card and not a static replay of a single cryptogram message.

This can enhance security when second authentication factors are not available. For example, when a user taps his or her random card to some random person's device, a second authentication factor is not available. In such scenarios, by tapping a card multiple times, the card can be validated to be a card that is being used to generate the cryptograms.

In some embodiments, after recording the digital signature that this has happened, the actual cryptogram message that was used to generate that signature may be stored, for example, on the database. The stored cryptogram message can serve as an audit mechanism because the stored cryptogram message can be revalidated. With the authentication mechanism of the contactless card, the current cryptogram message being authenticated is in the right counter range. Accordingly, the validation is able to establish that that message was once created by the contactless card.

In some embodiments, the recording of the cryptogram messages may act as a ledger of confirmation that the package was delivered if, for example, there is a dispute over whether or when a package has been delivered and who signed for it. For example, a customer may claim he or she received the package on a particular day within the time window specified by a return policy. However, referencing the stored cryptogram message, the merchant that shipped the package may establish that the customer in fact received the package on a prior day and therefore the return policy does not apply.

In some embodiments, a delivery address may be certified to act as a delivery requirement. For example, a package may be required to deliver to the certified address (e.g., a digitally signed address).

In some embodiments, certain conditions may need to be met for the digital signature to be applicable. For example, a product may have an expiration date, a guaranteed delivery date, and/or restrictions about how long it can be in transportation. For example, if a product subject to such restrictions (e.g., medicine, test samples, or perishable items) is not delivered within a certain time then, the conditions will not allow a consumer to sign for that product.

In some embodiments, the signed certificates can be scoped to a particular delivery transaction and enforce conditions and requirements of the delivery transaction. For example, a merchant can apply requirements that a package be delivered to a certain address or that the package delivery has these particular restrictions, the identity of that person signing for the package can be validated against those requirements. For example, a customer expecting a time-sensitive package may contract with a delivery company for a particular delivery date and time and the customer may not wish to take delivery of a package after the specified time. In such an example, the customer can prove at the time of delivery that the contract has been violated.

Throughout the disclosure, the term merchant is used, and it is understood that the present disclosure is not limited to a particular merchant or type of merchant. Rather, the present disclosure includes any type of merchant, vendor, or other entity involving in activities where products or services are sold or otherwise provided.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the delivery device 120 or 550, the user device 520, the server 130 or 530, and/or the contactless card 110 or 510 or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A contactless delivery system, comprising:
a contactless card comprising a card processor and a card memory, the card memory storing a first cryptogram that contains an unique identifier associated with a user account and a profile picture associated with the user account;
a server, comprising a server processor and a server memory,
wherein, after entry into a communication field generated by a card reader, the contactless card:
transmits the profile picture to the card reader,
transmits the first cryptogram to the card reader, and
receives a picture of an employee associated with the card reader, and
wherein the server:
receives the first cryptogram from the card reader,
validates the first cryptogram,
decrypts the first cryptogram and extracts the unique identifier,
queries, using the unique identifier, a database for an identity of the user account, the database containing one or more documents associated with the user account,
receives, from the database, the one or more documents to verify the identity of the user account,
receives a universal resource locator (URL) associated with a web page,
transmits the URL to a user device,
receives, via an input to the webpage, card information associated with the contactless card,
generates a digital signature based on the identity of the user account and the card information, and
transmits a verification notification including the identity of the user account and the digital signature.

2. The contactless delivery system of claim 1, wherein:
the system further comprises the user device, and the user device generates the communication field.

3. The contactless delivery system of claim 1, wherein:
the card memory further contains a counter value and a plurality of keys, and
the card processor generates the first cryptogram using the counter value, the plurality of keys, and the unique identifier.

4. The contactless delivery system of claim 3, wherein the card processor updates the counter value.

5. The contactless delivery system of claim 1, wherein:
the verification notification is transmitted to the user device storing information on a delivery package, and
the server receives the information on the delivery package as an authentication factor to verify the identity of the user account.

6. The contactless delivery system of claim 1, wherein the one or more documents comprises a copy of a driver license.

7. The contactless delivery system of claim 1, wherein:
the server transmits the verification notification to the user device, and
the digital signature is displayed on a display of the user device, the digital signature being used to sign a package receipt document displayed on the display of the user device.

8. The contactless delivery system of claim 1, wherein the contactless card includes a host card emulation device emulating the contactless card.

9. The contactless delivery system of claim 1, wherein the server:
retrieves a document of the user account from the database, and
transmits the document to verify the identity of the user account.

10. The system of claim 1, wherein:
the contactless card transmits, after entry into the communication field, the profile picture to the database.

11. The system of claim 1, wherein:
the digital signature comprises the signature of a user not associated with the user account, and
the server transmits an indirect signature notification to a user associated with the user account.

12. The system of claim 1, wherein the server:
stores the first cryptogram and a time of receipt associated with the first cryptogram in the database, and
establishes, based on the stored first cryptogram and time of receipt, a delivery date associated with a package.

13. The system of claim 12, wherein the server applies a return policy to the package based on the delivery date.

14. The system of claim 1, wherein the server:
receives, from the read of the contactless card based on a card tap notification, a second cryptogram,
validates the second cryptogram, and
determines, based on the validation of the first cryptogram and the validation of the second cryptogram, that the first cryptogram and the second cryptogram were generated by the contactless card.

15. A contactless delivery method, comprising:
transmitting, by a contactless card after entry into a communication field generated by a card reader, a profile picture associated with a user account and a cryptogram containing a unique identifier associated with the user account;
receiving, by a server the profile picture and the cryptogram;
validating, by the server, the cryptogram;
decrypting, by the server, the cryptogram;
extracting, by the server from the cryptogram, the unique identifier;
querying, by the server using the unique identifier, a database for an identity of the user account;
receiving, by the server from the database, one or more documents to verify the identity of the user account;
receiving, by the server from a delivery device, a universal resource locator (URL) associated with a webpage;
transmitting, by the server, the URL to a user device;
receiving, via an input to the webpage, card information associated with the contactless card;
generating, by the server, a digital signature based on the identity of the user account and the card information;
transmitting, by the server, a verification notification including the identity of the user account and the digital signature; and
receiving, by the contactless card, a picture of an employee associated with the card reader.

16. The contactless delivery method of claim 15, further comprising:
receiving, by the server, a card tap notification;
prompting, to read the contactless card, by the server, based on the card tap notification;
receiving, by the server, a tap-completed notification; and
generating, by the server, the digital signature based on the identity of the user account and the tap-completed notification.

17. A non-transitory computer-accessible medium storing executable instructions that, when executed by a server, cause the server to perform procedures comprising:
receiving, from a contactless card after entry into a communication field generated by a card reader, a profile picture associated with a user account and a first cryptogram containing a unique identifier associated with the user account;
validating the first cryptogram;
decrypting the first cryptogram;
extracting, from the first cryptogram, the unique identifier;
querying, using the unique identifier, a database for an identity of the user account;
receiving, from the database, one or more documents to verify the identity of the user account;
receiving, from a delivery device, a universal resource locator (URL) associated with a webpage;
transmitting the URL to a user device;
receiving, via an input to the webpage, card information associated with the contactless card;
generating a digital signature based on the identity of the user account and the card information;
transmitting a verification notification including the identity of the user account and the digital signature; and
receiving, by the contactless card, a picture of an employee associated with the card reader.

18. The contactless delivery method of claim 16, further comprising transmitting, by the server, the tap-completed notification to the delivery device.

19. The computer-accessible medium of claim 17, wherein:
the digital signature comprises the signature of a user not associated with the user account, and
transmitting an indirect signature notification to a user associated with the user account.

20. The computer-accessible medium of claim 17, the procedures further comprising:
storing the first cryptogram in the database;
after receiving of a second cryptogram, revalidating the first cryptogram;
identifying a counter range based on the revalidation of the first cryptogram;
validating the second cryptogram; and
associating the second cryptogram with the contactless card based on the counter range.

* * * * *